United States Patent
Hwang et al.

(10) Patent No.: US 9,713,076 B2
(45) Date of Patent: Jul. 18, 2017

(54) METHOD FOR RECEIVING SEARCH SIGNAL FOR DETECTING SMALL-SIZED CELL

(71) Applicant: LG ELECTRONICS INC., Seoul (KR)

(72) Inventors: Daesung Hwang, Seoul (KR); Yunjung Yi, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 14/782,453

(22) PCT Filed: Apr. 14, 2014

(86) PCT No.: PCT/KR2014/003171
§ 371 (c)(1),
(2) Date: Oct. 5, 2015

(87) PCT Pub. No.: WO2014/181972
PCT Pub. Date: Nov. 13, 2014

(65) Prior Publication Data
US 2016/0050617 A1 Feb. 18, 2016

Related U.S. Application Data

(60) Provisional application No. 61/821,696, filed on May 9, 2013, provisional application No. 61/869,126, filed on Aug. 23, 2013.

(51) Int. Cl.
*H04W 4/00* (2009.01)
*H04W 48/16* (2009.01)
*H04L 5/00* (2006.01)

(52) U.S. Cl.
CPC .......... *H04W 48/16* (2013.01); *H04L 5/001* (2013.01); *H04L 5/0053* (2013.01);
(Continued)

(58) Field of Classification Search
CPC ..... H04L 5/001; H04L 5/0048; H04L 5/0053; H04L 5/0057; H04L 5/0094; H04W 48/16
(Continued)

(56) References Cited

U.S. PATENT DOCUMENTS

2005/0237961 A1 10/2005 Yi et al.
2007/0254620 A1* 11/2007 Lindqvist ............. H04W 48/12
455/403
(Continued)

FOREIGN PATENT DOCUMENTS

| KR | 10-2010-0117522 | 11/2010 |
|---|---|---|
| KR | 10-2012-0015255 | 2/2012 |
| WO | 2010/005612 | 1/2010 |

OTHER PUBLICATIONS

LG Electronics, "Discussion on small cell discovery," 3GPP TSG RAN WG1 Meeting #72b, R1-131303, Apr. 2013, 8 pages.
(Continued)

*Primary Examiner* — Babar Sarwar
(74) *Attorney, Agent, or Firm* — Lee, Hong, Degerman, Kang & Waimey

(57) ABSTRACT

According to one embodiment of the present description, a method by which a terminal receives a search signal from a small-sized cell is provided. The method can comprise the steps of: receiving, from a serving cell, configuration set information of search signals of clustered neighboring small-sized cells for each cluster; determining configuration information of a search signal of each of the neighboring small-sized cells belonging to a corresponding cluster on the basis of the set information; and detecting a search signal
(Continued)

from a corresponding small-sized cell on the basis of the determined configuration information.

14 Claims, 14 Drawing Sheets

(52) U.S. Cl.
CPC .......... *H04L 5/0094* (2013.01); *H04L 5/0048* (2013.01); *H04L 5/0057* (2013.01)

(58) Field of Classification Search
USPC .... 455/412.1–414.2, 418–422.1, 435.1–453, 455/456.1, 552.1, 509; 370/328–332, 344
See application file for complete search history.

(56) References Cited

U.S. PATENT DOCUMENTS

| | | | | |
|---|---|---|---|---|
| 2010/0008282 A1* | 1/2010 | Bhattad | ................ | H04J 11/0069 370/312 |
| 2010/0008323 A1* | 1/2010 | Deshpande | ........... | H04W 36/00 370/331 |
| 2011/0199986 A1* | 8/2011 | Fong | ..................... | H04L 5/0035 370/329 |
| 2012/0225680 A1* | 9/2012 | Suh | ....................... | H04W 16/32 455/501 |
| 2013/0083744 A1* | 4/2013 | Peng | ..................... | H04W 52/04 370/329 |
| 2014/0198764 A1* | 7/2014 | Han | ....................... | H04L 5/0012 370/330 |
| 2014/0204812 A1* | 7/2014 | Li | ........................ | H04W 72/042 370/280 |
| 2014/0243002 A1* | 8/2014 | Muruganathan | .. | H04W 72/0426 455/450 |
| 2014/0293988 A1* | 10/2014 | Han | ....................... | H04L 5/0085 370/344 |
| 2014/0328307 A1* | 11/2014 | Takano | ................. | H04W 48/18 370/329 |
| 2015/0004969 A1* | 1/2015 | Han | .................. | H04W 52/0251 455/434 |
| 2015/0155928 A1* | 6/2015 | Seo | ....................... | H04L 5/0053 370/329 |
| 2015/0230153 A1* | 8/2015 | Zhang | .................... | H04W 48/16 455/434 |
| 2016/0066255 A1* | 3/2016 | Marinier | ............... | H04W 48/16 370/350 |

OTHER PUBLICATIONS

PCT International Application No. PCT/KR2014/003171, Written Opinion of the International Searching Authority dated Jul. 24, 2014, 1 page.

* cited by examiner

METHOD FOR RECEIVING SEARCH SIGNAL FOR DETECTING SMALL-SIZED CELL

CROSS-REFERENCE TO RELATED APPLICATIONS

This application is the National Stage filing under 35 U.S.C. 371 of International Application No. PCT/KR2014/003171, filed on Apr. 14, 2014, which claims the benefit of U.S. Provisional Application Nos. 61/821,696, filed on May 9, 2013 and 61/869,126, filed on Aug. 23, 2013, the contents of which are all hereby incorporated by reference herein in their entirety.

BACKGROUND OF THE INVENTION

Field of the invention

The present invention relates to a method of receiving a discovery signal for detecting a small cell.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next-generation mobile communication system, it is expected that a small cell of which a cell coverage radius is small is added in macro cell coverage.

However, since it is expected that such a small cell is densely deployed, there is a disadvantage in that interference may be increased. To solve this problem, it can be improved such that the small cell is temporarily off and is then on according to an interference amount.

However, since a user equipment (UE) cannot detect the small cell in a state where the small cell is temporarily off, there is a problem in that a fast connection cannot be achieved even if the small cell is on again at a later time.

SUMMARY OF THE INVENTION

Accordingly, a disclosure of the present specification aims to solve the aforementioned problem.

In order to achieve the aforementioned purpose, specifically, according to one disclosure of the present specification, a small cell which can be temporarily off or on can transmit a discovery signal, and a serving cell of a user equipment (UE) can report information regarding the discovery signal of the small cell to the UE.

More specifically, according to one disclosure of the present specification, there is provided a method in which a terminal receives a discovery signal from a small cell. The method may comprise: receiving, from a serving cell, information on configuration set of discovery signals with respect to clustered neighbor small cells, wherein the information is received per each cluster; determining configuration information for respective discovery signals of the neighbor small cells belonging to a corresponding cluster on the basis of the information; and detecting the discovery signal from a corresponding small cell on the basis of the determined configuration information.

The discovery signal may be received on a resource element (RE) other than an RE configured for channel state information-reference signal (CSI-RS) of the corresponding small cell.

The configuration information may include one or more of transmission timing, physical resource block (PRB) mapping scheme, and sequence index of the discovery signal.

A radio resource on which the discovery signal is transmitted from the corresponding small cell may be configured not to overlap with a radio resource for a CSI-RS or CSI-interference measurement (IM) from another neighbor small cell.

The discovery signal may be also received on a first slot of a special subframe based on time division duplex (TDD).

The information on configuration set of the discovery signals of the neighbor small cells may be determined based on a physical cell identifier (ID) or an identity dedicated to the small cell.

An RE on which the discovery signal is detected from the corresponding small cell may operate as a muting RE by another small cell.

Meanwhile, according to one disclosure of the present specification, there is also provided a terminal for receiving a discovery signal from a small cell. The terminal may comprise: a receiver for receiving, from a serving cell, information on configuration set of discovery signals with respect to clustered neighbor small cells, wherein the information is received per each cluster; and a controller for determining configuration information for respective discovery signals of the neighbor small cells belonging to a corresponding cluster on the basis of the information, and for detecting the discovery signal from a corresponding small cell on the basis of the determined configuration information.

According to a disclosure of the present specification, since a serving cell of a user equipment (UE) transmits information regarding a discovery signal of neighbor small cells to the UE in a situation where small cells are densely deployed, the UE can rapidly detect the discovery signal from the neighbor small cells.

DESCRIPTION OF EXEMPLARY EMBODIMENTS

Figure 1:
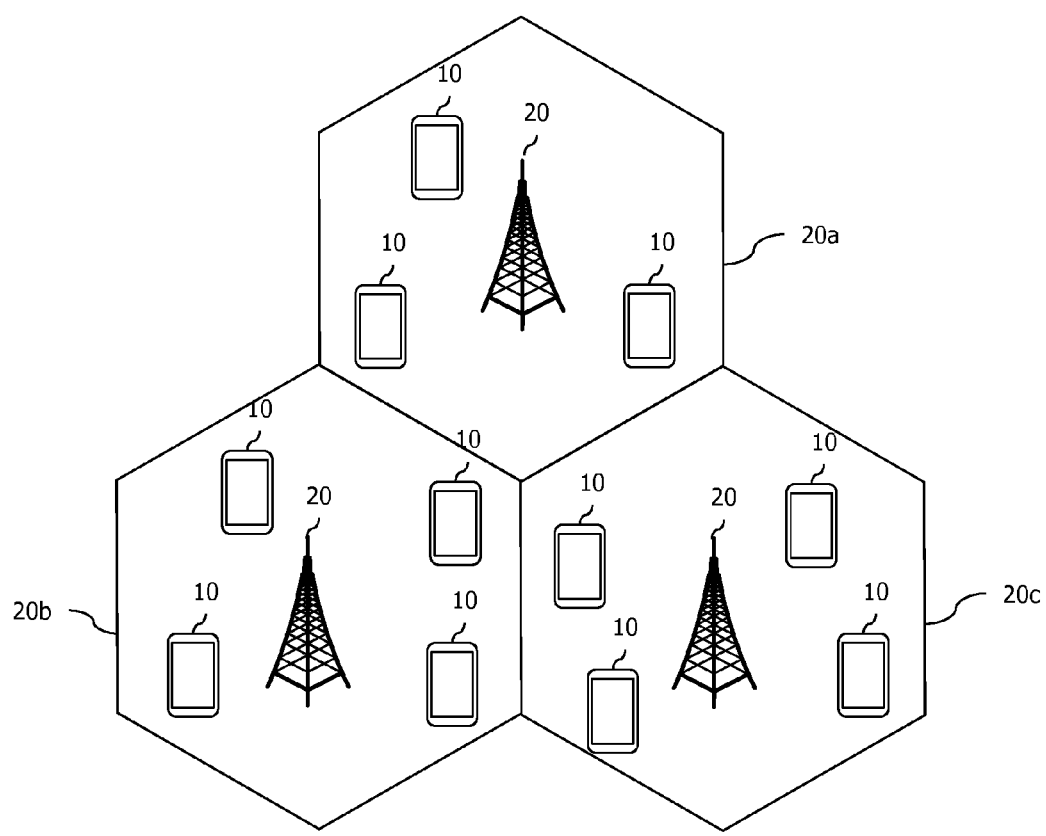
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc. A base station generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The UE generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
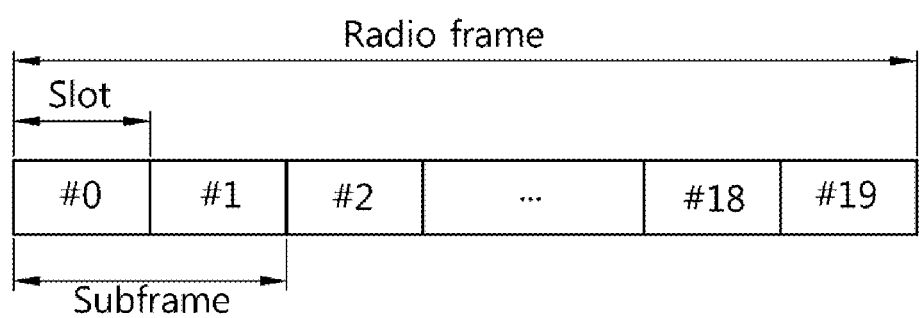
FIG. 2 illustrates the architecture of a radio frame according to frequency division duplex (FDD) of $3^{rd}$ generation partnership project (3GPP) long term evolution (LTE).

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
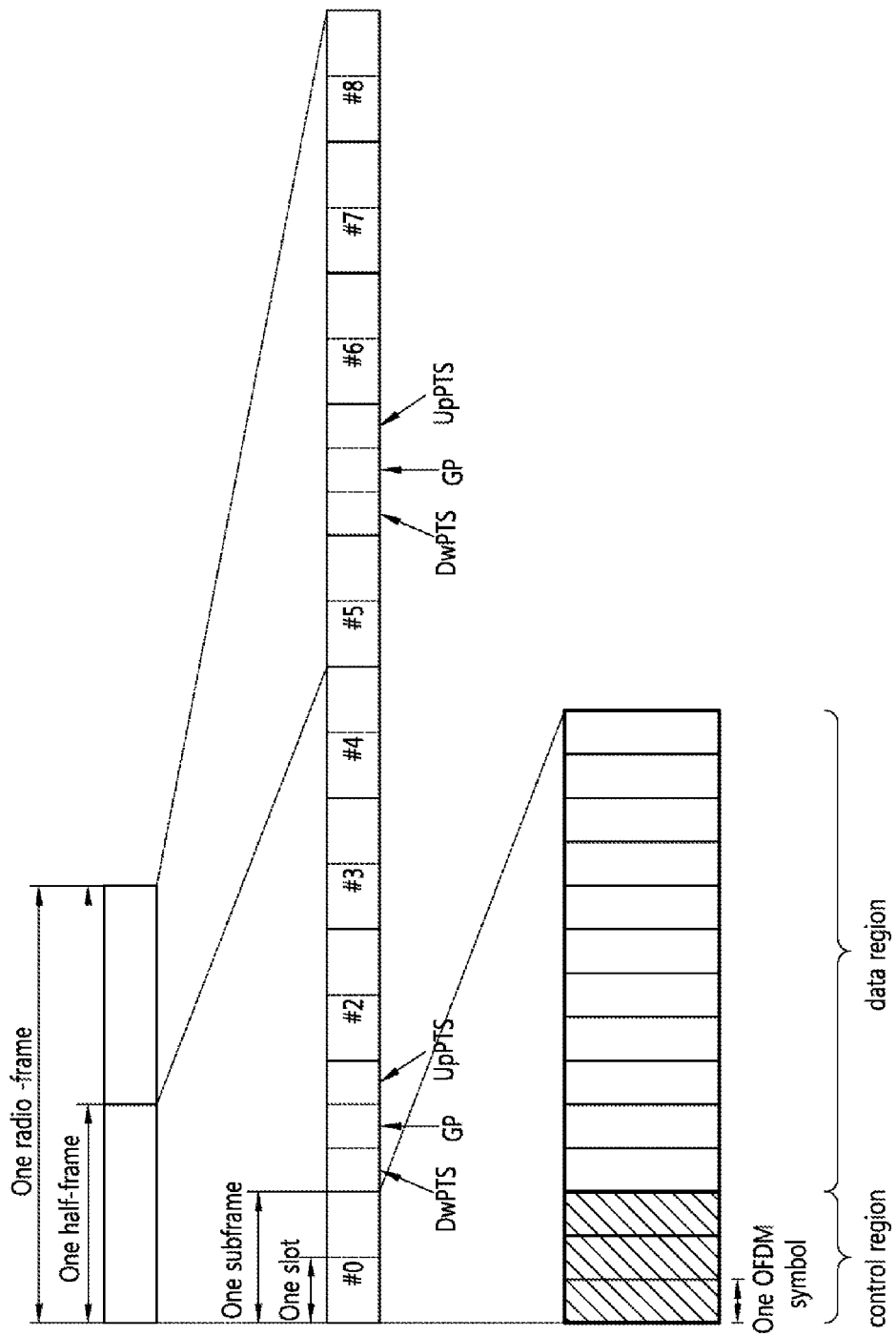
FIG. 3 illustrates the architecture of a downlink radio frame according to time division duplex (TDD) in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal The UpPTS is used for channel estimation in the base station and for establishing uplink transmission sync of the terminal The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uration | Switch-point perio-dicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL Config- uration | Switch- point perio- dicity | Subframe index |  |  |  |  |  |  |  |  |
|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
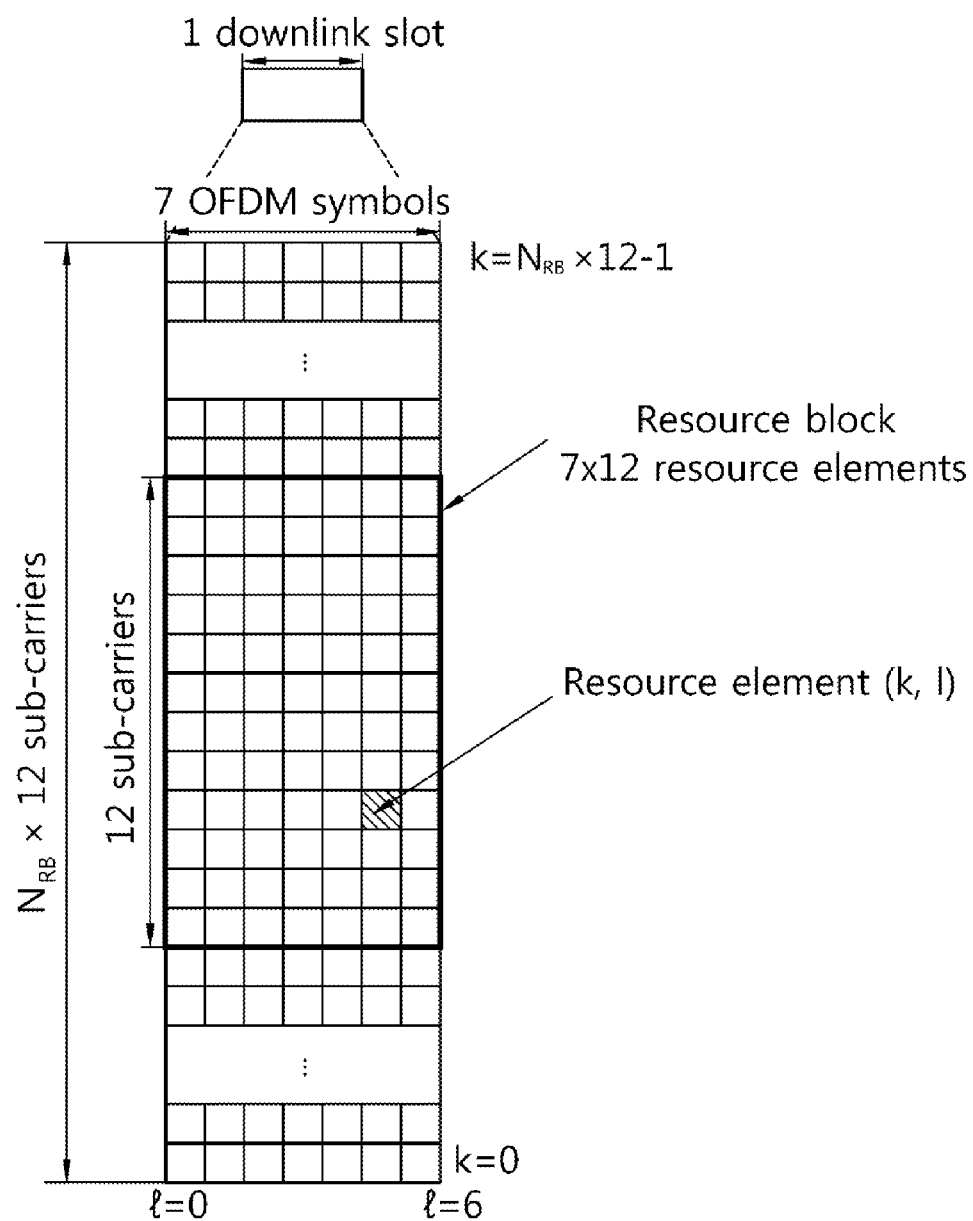
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
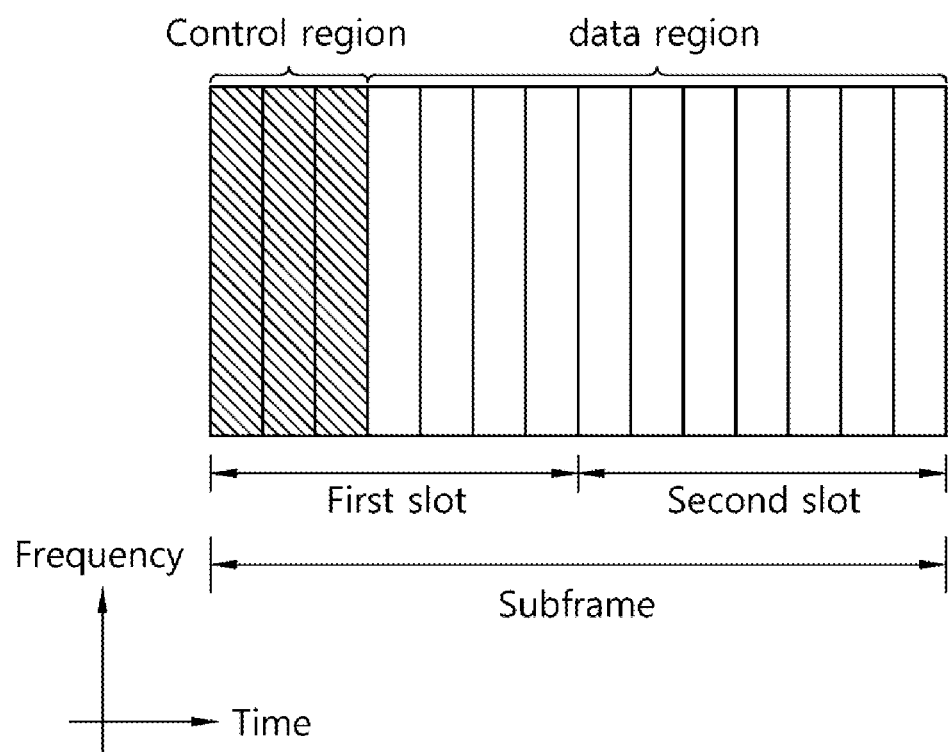
FIG. 5 illustrates the architecture of a downlink subframe.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of a higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
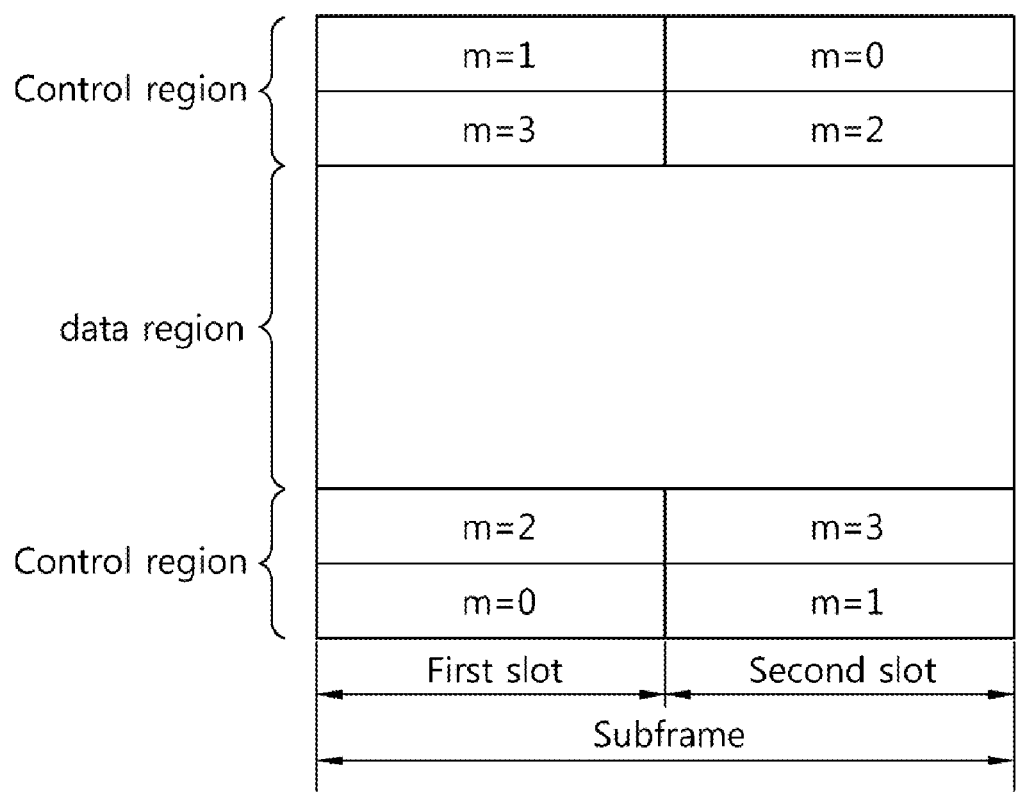
FIG. 6 illustrates the architecture of an uplink subframe in 3GPP LTE.
Figure 6:
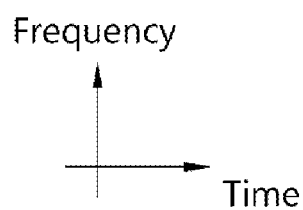

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
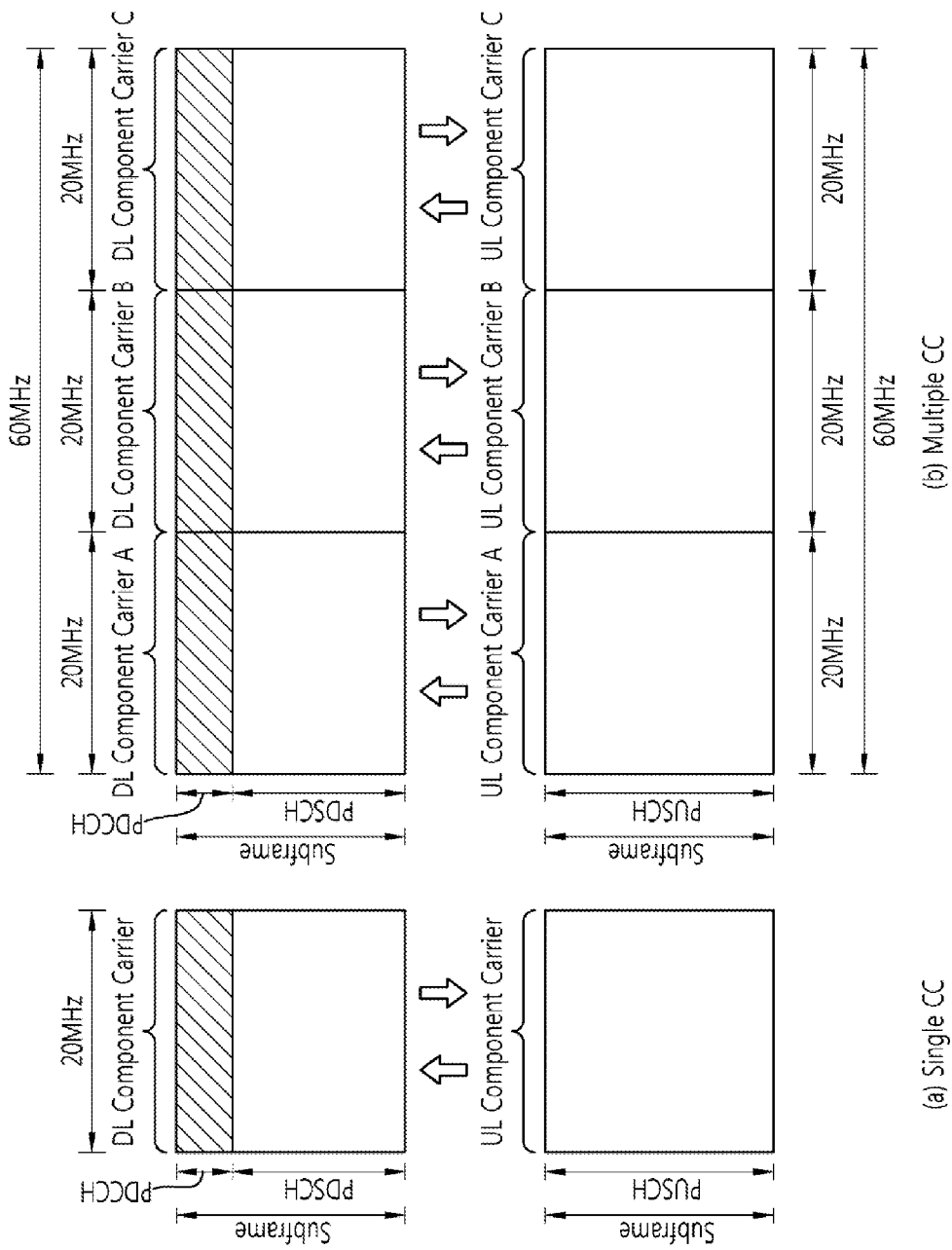
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal On the contrary, in the carrier aggregation (CA) system, a plurality of component carriers (DL CC A to C, UL CC A to C) may be assigned to the terminal Component carrier (CC) means the carrier used in then carrier aggregation system and may be briefly referred as carrier. For example, three 20 MHz component carriers may be assigned so as to allocate a 60 MHz bandwidth to the terminal Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell 2 is configured by connection of DL CC2 and UL CC2, activation of serving cell 2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70MHz band, the configuration may be made as follows: 5 MHz CC(carrier #0)+20 MHz CC(carrier #1) +20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
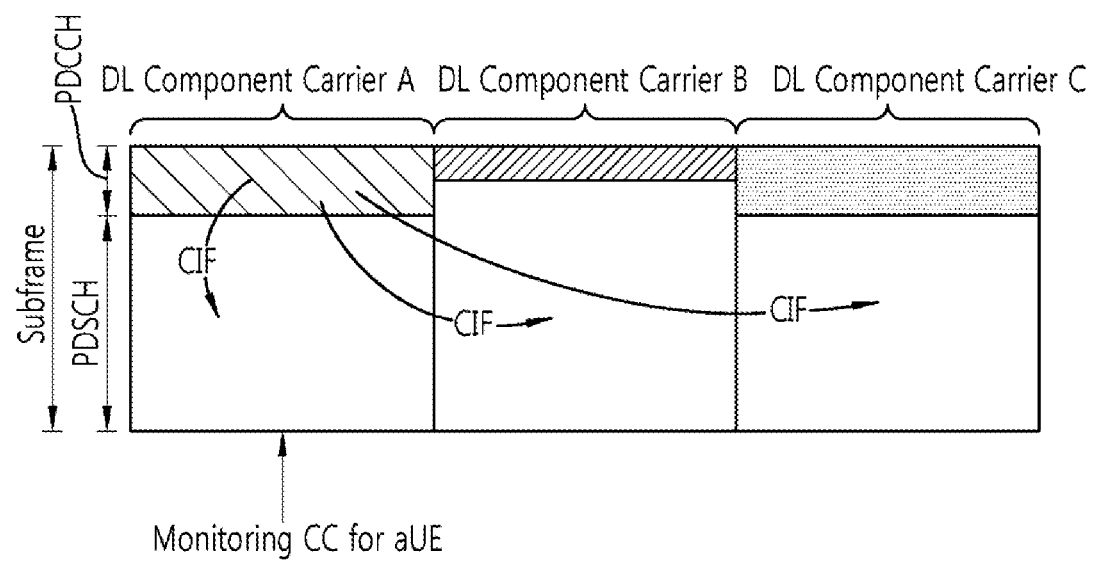
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 9:
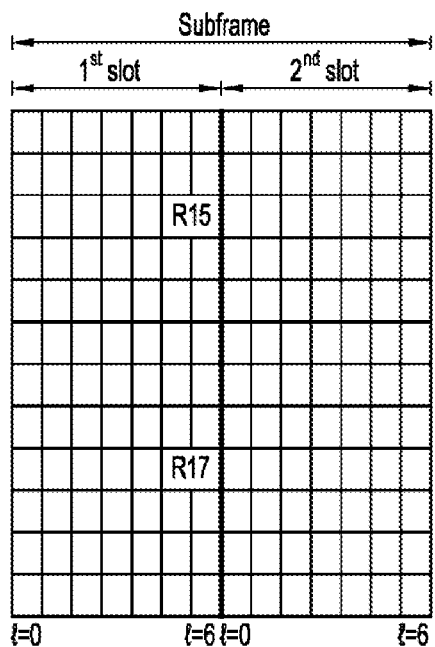
FIG. 9 illustrates an example of a resource block (RB) to which a channel staste information-reference signal (CSI-RS) is mapped among reference signals.
Figure 9:
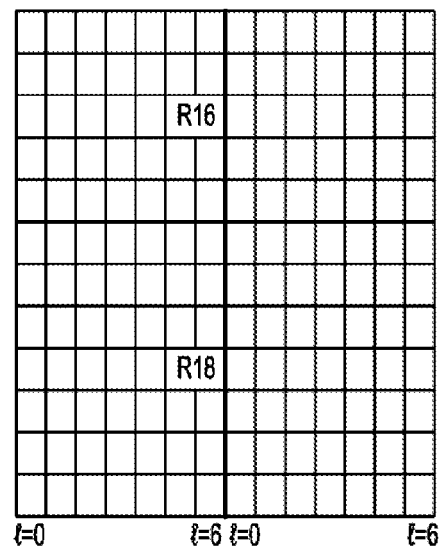
Figure 9:
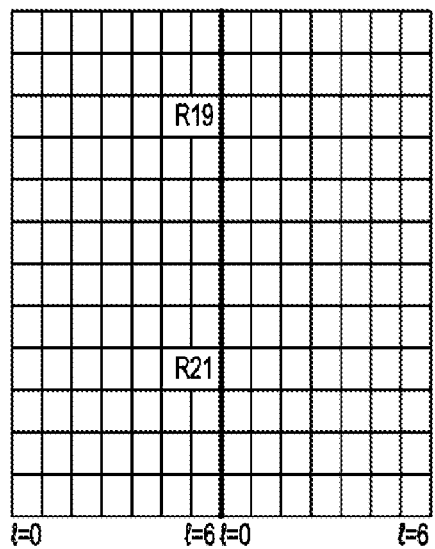
Figure 9:
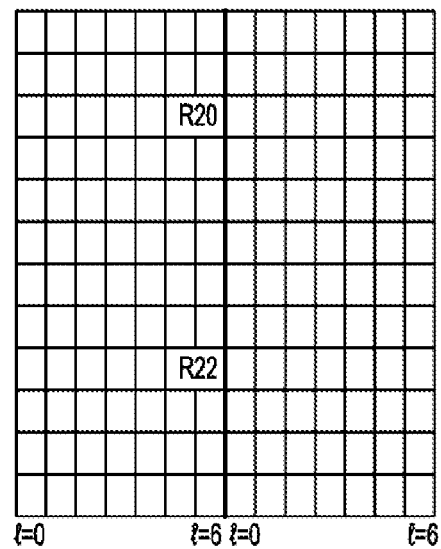

FIG. 9 illustrates an example of an RB to whitch a CSI-RS is mapped among reference signals.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, ..., 18 and p=15, ..., 22, respectively. That is, CSI-RSs may be transmitted through one, two, four, and eight antenna ports. See 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 1 shows an example of CSI-RS-Config IE.

TABLE 2

```
CSI-RS-Config-r10 ::=          SEQUENCE {
csi-RS-r10                     CHOICE {
release                        NULL,
setup                          SEQUENCE {
antennaPortsCount-r10              ENUMERATED {an1, an2, an4, an8},
resourceConfig-r10                 INTEGER (0..31),
subframeConfig-r10                 INTEGER (0..154),
p-C-r10                            INTEGER (-8..15)
}
}                                              OPTIONAL,    -- Need ON
zeroTxPowerCSI-RS-r10          CHOICE {
release                        NULL,
setup                          SEQUENCE {
zeroTxPowerResourceConfigList-r10   BIT STRING (SIZE (16)),
zeroTxPowerSubframeConfig-r10         INTEGER (0..154)
}
}                                              OPTIONAL    -- Need ON
}
--ASN1STOP
```

Referring to Table 2, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1, $n_s$ is a slot number in the radio frame, and l is an OFDM symbol number in the slot. c(i) is a pseudo random sequence and is started at each OFDM symbol with $c_{init}$ indicated in Equation 1. $N_{ID}^{cell}$ means a physical cell ID.

In sub-frames configured to transmit CSI-RSs, the reference signal sequence $r_{l,n_s}(m)$ is mapped to a complex value modulation symbol $a_{k,l}^{(p)}$ used as a reference symbol for antenna port p.

The relationship between $r_{l,n_s}(m)$ and $a_{k,l}^{(p)}$ is given as in the following equation.

$$a_{k,l}^{(p)} = w_{l''} \cdot r(m) \quad \text{[Equation 2]}$$

where, $$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the above Equation, (k', l') and $n_s$ are given in Tables 3 and 5 described below. A CSI-RS may be transmitted in a downlink slot where ($n_s$ mod 2) meets the conditions in Tables 3 and 4 to be described below (where, 'mod' means modular computation. That is, ($n_s$ mod 2) means the remainder obtained by dividing $n_s$ by 2).

Table 3 represents a CSI-RS configuration in normal CP, and Table 4 represents a CSI-RS configuration in extended CP.

TABLE 3

| | | Number of configured CSI-RSs | | | | | |
|---|---|---|---|---|---|---|---|
| | CSI-RS | 1 or 2 | | 4 | | 8 | |
| | config-uration index | (k', l') | ns mod 2 | (k', l') | ns mod 2 | (k', l') | ns mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | | Number of configured CSI-RSs | | | | | |
|---|---|---|---|---|---|---|---|
| | CSI-RS | 1 or 2 | | 4 | | 8 | |
| | Config-uration index | (k', l') | ns mod 2 | (k', l') | ns mod 2 | (k', l') | ns mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |

TABLE 4-continued

| | | Number of configured CSI-RSs | | | | | |
|---|---|---|---|---|---|---|---|
| CSI-RS | | 1 or 2 | | 4 | | 8 | |
| Config- uration index | (k', l') | ns mod 2 | (k', l') | ns mod 2 | (k', l') | ns mod 2 | |
| TDD frame | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 3 and 4. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

The below Table shows an example of a configuration of a sub-frame where a CSI-RS is transmitted.

TABLE 5

| CSI-RS- SubframeConfig ICSI-RS | CSI-RS period TCSI-RS (sub-frame) | CSI-RS sub-frame offset ΔCSI-RS (subframes) |
|---|---|---|
| 0-4 | 5 | ICSI-RS |
| 5-14 | 10 | ICSI-RS-5 |
| 15-34 | 20 | ICSI-RS-15 |
| 35-74 | 40 | ICSI-RS-35 |
| 75-154 | 80 | ICSI-RS-75 |

Referring to the above Table, depending on the CSI-RS sub-frame configuration ($I_{CSI-RS}$), the period ($T_{CSI-RS}$) of the sub-frame where CSI-RSs are transmitted and an offset ($\Delta_{CSI-RS}$) may be determined The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 11 illustrates resource elements used for CSI-RSs when the CSI-RS configuration index is 0 in normal CP. Rp denotes a resource element used for CSI-RS transmission on antenna port p. Referring to FIG. 11, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

Hereinafter, one aspect of the present invention will be described.

Figure 10:
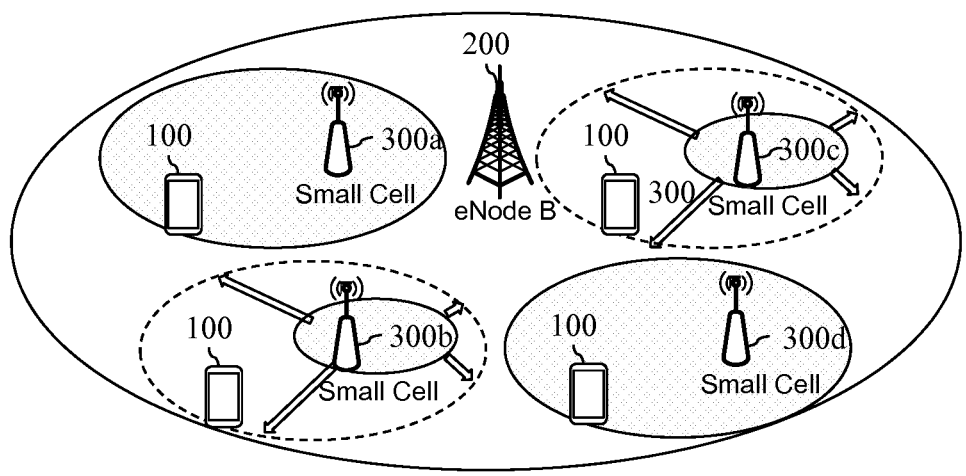
FIG. 10 illustrates a heterogeneous network environment in which a macro cell and a small cell co-exist and which is possibly used in a next-generation wireless communication system.

FIG. 10 illustrates a heterogeneous network environment in which a macro cell and a small cell co-exist and which is possibly used in a next-generation wireless communication system.

A heterogeneous network in which one or more small cells 300a, 300b, 300c, and 300d (e.g., a pico cell, a femto cell, or a micro cell) having low transmission power exists in the coverage of a legacy marco cell 200 in an overlapping manner is under discussion in a next-generation communication standard after 3GPP LTE/LTE-A.

Referring to FIG. 10, the macro cell 200 may overlap with one or more small cells 300. A service of the macro cell 200 is provided by a macro eNodeB (MeNB). In the present specification, the macro cell and the MeNB may be used together. A UE 100 having access to the macro cell 200 may be referred to as the macro UE 100. The marco UE 100 receives a donwlink signal from the MeNB, and transmits an uplink signal to the MeNB.

The aforementioned small cells 300a, 300b, 300c, and 300d are also referred to as a femto cell, a pico cell, or a micro cell. A service of the small cell is provided by a pico eNodeB, a home eNodeB (HeNB), a relay node (RN), etc. For convenience, the pico eNodeB, the HeNB, and the RN are collectively referred to as the HeNB. In the present specificatoin, the micro cell and the HeNB may be used together. The small cell may be divided into an open access (OA) cell and a closed subscriber group (CSG) cell according to an accessibility. The OA cell implies a cell in which the UE 100 can receive a service anytime when necessry without an additional access restriction. On the other hand, the CSG cell implies a cell in which only the authorized specific UE 100 can receive a service.

In such a heterogeneous network, an empty space in the coverage of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

On the other hand, the illustrated small cells 300b and 300c may extend or reduce their coverage in order to decrease an interference influence on the other neighbor small cells 300a and 300b or the macro cell 200 according to a situation. Such a coverage extension and reduction is called cell breathing. Alternatively, the small cells 300b and 300c may be on or off according to a situation.

However, when the small cells 300b and 300c reduce their coverage or are off, there is a disadvantage in that mobility of the UE 100 cannot be supported. In addition, it may be confused when the UE 100 is in an off state or when the small cells 300b and 300c of which the coverage is reduced suddenly become an on state or when their coverage is extended.

Accordingly, disclosures of the present specification aim to provide a method of solving such problems.

<Brief Description On Disclosures Of The Present Specification>

As described above, a plurality of small cells may be employed in a next-generation system as one method of improving performance Further, as described above, the small cell may reduce its coverage or may be in an off state, or may be in a state in which transmission is partially or entirely restricted.

As such, even if the small cell reduces the coverage or is in the off state or if transmission is partially or entirely restricted, the small cell according to the disclosures of the present specification may transmit a discovery signal to report its existence.

However, in a situation where small cells are densely deployed, interference between respective small cells may be significantly increased due to the discovery signal, and thus the UE may have difficulty in receiving a plurality of discovery signals. As a solution for this, interference between discovery signals transmitted from a plurality of cells through FDM/CDM, such as, CSI-RS, may be reduced, or in addition thereto, other channels (e.g., PDSCH) may be avoided from being transmitted in a region in which a corresponding discovery signal is transmitted. The present specification proposes a method of configuring information regarding the discovery signal (hereinafter, side information) based on the CSI-RS and a method of transmitting a discovery signal by using the information. Hereinafter, a CSI-RS for a discovery signal is called a DS CSI-RS.

Figure 11A:
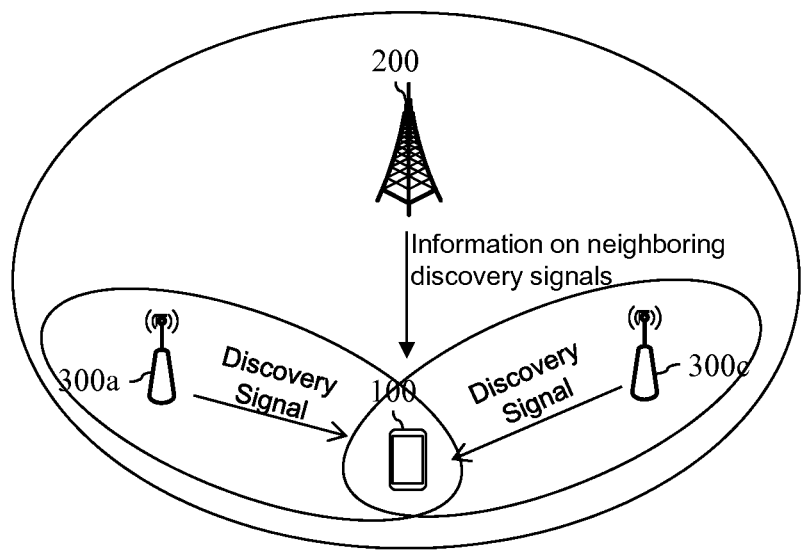
FIG. 11A and FIG. 11B illustrate an example of a method according to a disclosure of the present specification.
Figure 11B:
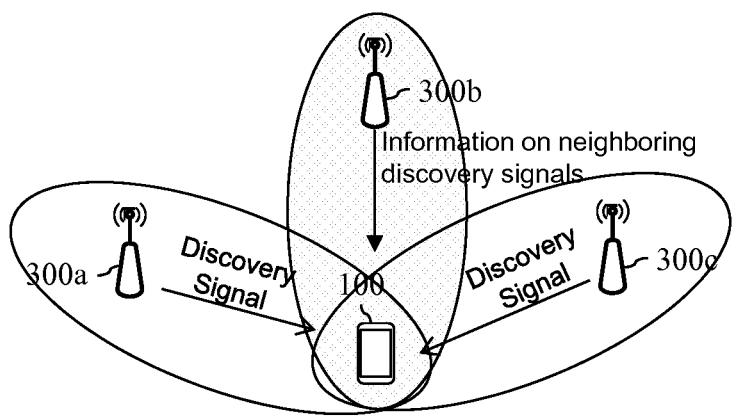

FIG. 11A and FIG. 11B illustrate an example of a method according to a disclosure of the present specificatoin.

Referring to FIG. 11A, a serving cell of a UE 100 is a macro cell 200, and several small cells 300a and 300c are present in the coverage of the macro cell 200. Each of the small cells 300a and 300c transmits a discovery signal. The macro cell 200 corresponding to the serving cell collects information on a neighboring discovery signal and thereafter transmits the information.

Further, referring to FIG. 11B, a serving cell of a UE 100 is a small cell 300b, and several small cells 300a and 300c are present nearby. Each of the small cells 300a and 300c transmits a discovery signal. The small cell 300b corresponding to the serving cell collects information on a neighboring discovery signal and thereafter transmits the information.

For this, each of the small cells 300a and 300c may deliver information on their discovery signals to neighbor cells.

The information on the neighboring discovery signal may include, for example, transmission timing, a PRB mapping scheme, a sequence index, etc. By delivering the information regarding the neighboring discovery signal to the UE, the UE can effectively detect the discovery signal of the small cell.

Figure 12:
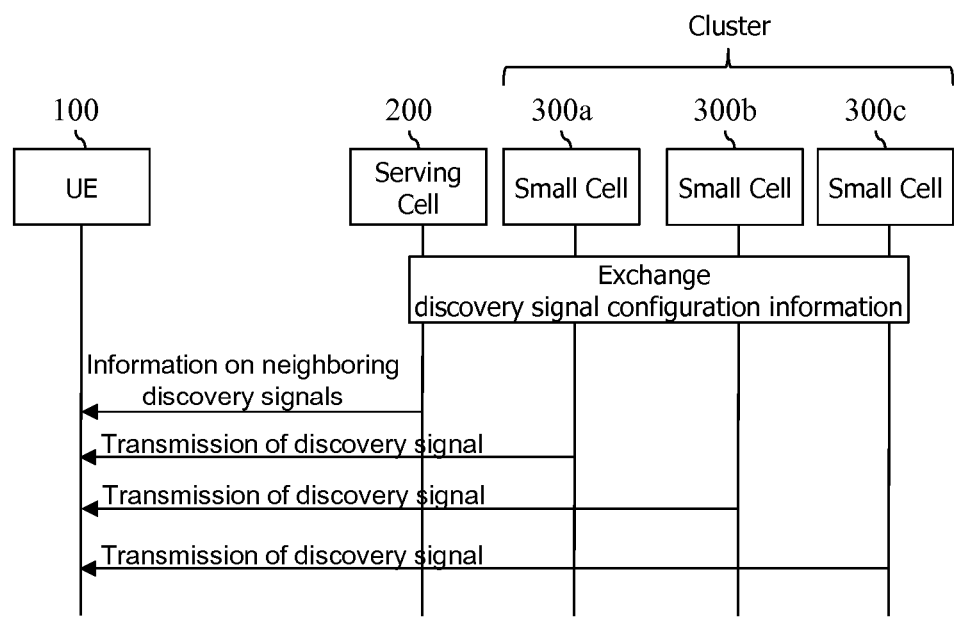
FIG. 12 illustrates an example of a method according to a disclosure of the present specification.

FIG. 12 illustrates an example of a method according to a disclosure of the present specification.

As can be seen from FIG. 12, small cells 300a, 300b, and 300c may belong to the same cluster. A serving cell 200 may acquire discovery signal configuration information from the small cells 300a, 300b, and 300c belonging to the same cluster. The serving cell 200 may deliver neighboring discovery signal information to a UE 100 on the basis of the acquired information.

In this case, all of the small cells 300a, 300b, and 300c belonging to the same cluster are time synchronized, and thus a discovery signal may be transmitted at the same transmission timing.

This is to decrease inter-cell interference through FDM/CDM/TDM similarly to a CSI-RS. To facilitate understanding of the description, the CRI-RS may be transmitted through 1, 2, 4, or 8 antenna ports (APs) in an LTE Rel-10 system, and a configuration thereof differs depending on the number of APs. Further, two APs may be aggregated in pair for the CRI-RS, and a CSI-RS corresponding to APs belonging to the same pair is transmitted on the same RE and is identified through CDM. A CSI-RS of a different pair is identified through FDM (and TDM). However, a discovery signal may be configured irrespective of the AP, and thus a DS CSI-RS may be transmitted through one AP. In addition, in an environment where small cells are densely deployed, the number of discovery signals to be received by each UE may be significantly increased. Therefore, for effective detection, the number of discovery signals to be configured may be set to be greater than the number of configurations of the conventional CSI-RS.

For this, one disclosure of the present specification provides several methods. In a method (A), CDM information (e.g., an OCC index) used for the discovery signal may be considered when a DS CSI-RS is configured, so that a UE can identify discovery signals transmitted from the aforementioned AP belonging to the same pair. For example, in a CSI-RS configuration, different DS CSI-RS configurations may be made by identifying an OCC for AP={15} and an OCC for AP={16} in an RE set for AP={15,16}. In particular, since it can be assumed that time synchronization is achieved in at least the same cluster in case of a small cell in unit of a cluster (or group), a plurality of discovery signals can be identified through CDM. In a method (B), since the conventional CSI-RS has a low density but a discovery signal requires improved detection performance, the number of DS CSI-RS configurations may be extended in such a manner that CSI-RS configurations for a slot 1 are also extended for a slot 0. As a more specific example, in case of the conventional CSI-RS, when AP=1, 2 in a normal CP, a CSI-RS configuration corresponding to the slot 1 allows CSI-RS mapping to be possible on all REs of $3^{rd}$ and $4^{th}$ OFDM symbols in the slot 1, allows CSI-RS mapping to be possible on REs corresponding to 4 subcarriers as to 6th and 7th OFDM symbols, and thus 16 configurations are present in the slot 1. On the other hand, in case of the conventional CSI-RS, CSI-RS mapping is possible on REs corresponding to 4 subcarriers as to 6th and 7th OFDM symbols of the slot 0, and thus only 4 configurations are present in the slot 0. However, the discovery signal may have a higher priority that the CSI-RS, and different channels may be prevented from being transmitted simultaneously. Therefore, as one way of supporting a plurality of small cells, all REs corresponding to all subcarriers may be allowed to be mapped to a DS CSI-RS in $3^{rd}$ and $4^{th}$ OFDM symbols in the slot 0, and in this manner, a DS CSI-RS configuration can be extended. In addition, it may also be extended to REs corresponding to different OFDM symbols (e.g., REs for the conventional DMRS).

Meanwhile, the DS CSI-RS configuration may be set by considering a transmission period and a subframe offset together in addition to a transmission pattern. In the above case, a period for the DS CSI-RS may be a fixed value.

Figure 13:
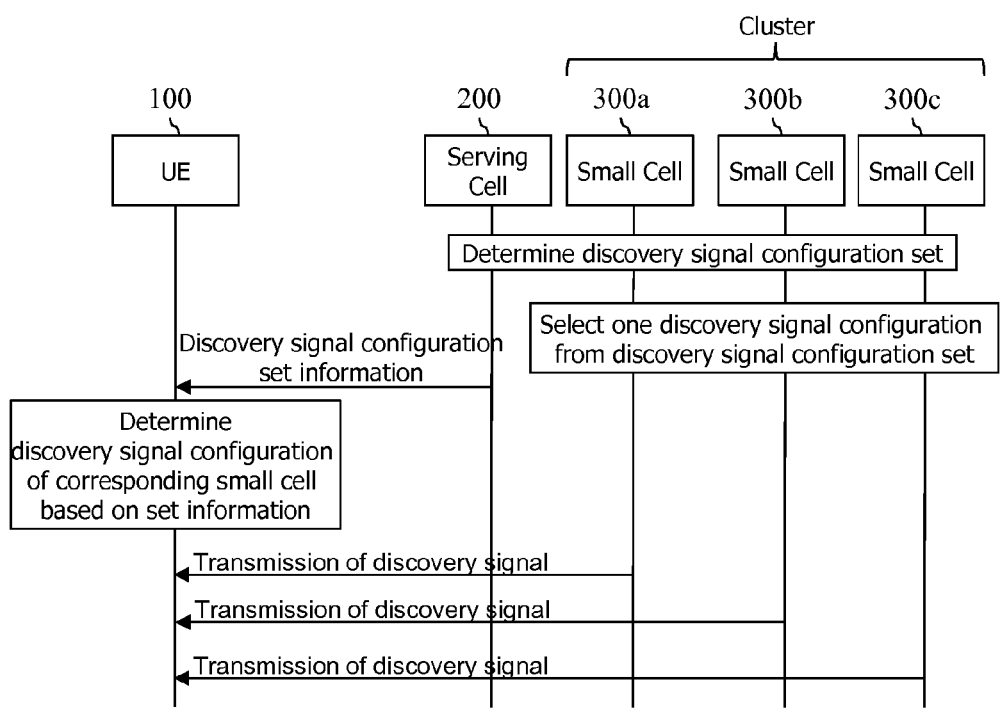
FIG. 13 illustrates an example of a method according to another disclosure of the present specification.

FIG. 13 illustrates an example of a method according to another disclosure of the present specification.

Referring to FIG. 13, small cells 300a, 300b, and 300c belonging to the same cluster may have a discovery signal configuration of the same set.

For example, a serving cell 200 may determine a discovery signal configuration set as to the small cells belonging to the same cluster, and thereafter may report it to each small cell through a higher layer signal. Alternatively, in a case where the small cells belonging to the same cluster have dedicated identities for the small cells or physical cell IDs according to a specific rule, each of the small cells may know that they belong to the same cluster, and thus may determine the discovery signal configuration set to be the same. Subsequently, each of the small cells may select one discovery signal configuration from the discovery signal configuration set so that the discovery signal configurations are different from each other. As such, since the discovery signal configurations are set differently, REs on which the discovery signal is transmitted are different, and as a result, interference may be restricted. For example, an RE on which any small cell transmits a discovery signal may operate as a muting RE by a different small cell.

The UE 100 may receive information regarding the discovery signal configuration set, and may know a discovery signal configuration of a corresponding small cell on the basis of the set information. In addition, the UE may know an RE on which the discovery signal is transmitted on the basis of the discovery signal configuration information of the corresponding small cell, and may receive a discovery signal from a different small cell in a muting RE of the corresponding small cell on the basis of the discovery signal configuration information. In this case, the UE 100 may separately receive muting RE information.

Meanwhile, each of the small cells may select a plurality of discovery signal configurations from the discovery signal configuration set instead of selecting one discovery signal configuration. An advantage for a case of selecting only one discovery signal configuration may be interpreted that interference is minimized by maximizing the number of discovery signals of a small cell that can be effectively identified, and an advantage for a case of selecting a plurality of discovery signal configurations may be interpreted that detection performance is improved by increasing the number of REs for a discovery signal of each small cell or by extending a sequence length.

As described above, the small cells set the discovery signal configurations differently, thereby minimizing mutual interference. However, in order to improve detection performance due to an actual interference decrease, when a discovery signal is transmitted in a specific small cell, the specific small cell and other neighbor cells need to restrict transmission of a physical channel.

First, a synchronization signal (e.g., PSS/SSS) and a PBCH must not be transmitted on an RE on which the specific small cell transmits the discovery signal. If the synchronization signal and the PBCH are configured to be transmitted simultaneously and thus a collision occurs, the small cell must not perform transmission in practice even if the discovery signal is configured to be transmitted in a corresponding subframe. This is to avoid performance deterioration for the legacy UE.

On the other hand, if a collision occurs since the discovery signal is configured to be transmitted on a specific RE and a PDSCH corresponding to an SIB1 or a paging message of a primary cell (Pcell) is also configured to be transmitted, this may be handled according to a priority. Methods thereof will be described below.

In a first method, a discovery signal may not be transmitted in a subframe in which an SIB1 is transmitted or a subframe in which a paging message of a Pcell is transmitted or a subframe in which a paging message for a cell supporting a control plane is transmitted in dual connectivity.

In a second method, a priority among an SIB1, a paging message, and a discovery signal may be reported to a UE through a higher layer signal. The higher layer signal may be transmitted from an MIB or a macro cell or a serving cell. Again, the priority between the paging message and the discovery signal may be delivered to a UE by being included in an SIB. In this case, when the discovery signal and the SIB1 or the paging message are present in the same subframe, a channel having a top priority may be transmitted according to the priority, and thus the UE may receive only the channel having the top priority.

In a third method, when a discovery signal is transmitted in a subframe in which an SIB1 or a paging message of a Pcell is transmitted, the SIB1 or the paging message of the Pcell are dropped. The reason above is to allow a UE of a next-generation system to increase detection performance on a corresponding cell even if there is performance deterioration of the legacy UE, when a period of the discovery signal is longer than a period of the SIB1 or the paging.

In a fourth method, a priority for a discovery signal is set to be lower than that of an SIB1 and to be higher than that of a paging message of a Pcell. When the discovery signal and the SIB1 or the paging message of the Pcell are transmitted in the same subframe, the SIB1 is transmitted in the former case, and the discovery signal is transmitted in the latter case.

On the other hand, it may be requested to restrict transmission for the remaining channels other than the PSS/SSS, PBCH, and a PDSCH corresponding to the SIB1 or the paging message. As a more specific example, a corresponding small cell (and small cells in the same cluster) may restrict transmission of the PDSCH and an EPDCCH as to corresponding REs according to a discovery signal configuration assigned to a small cell. In case of the PDCCH, transmission may be limitedly allowed when it corresponds to an uplink (UL) grant or corresponds to a downlink (DL) semi-persistent scheduling (SPS), and transmission may be restricted as to other PDCCHs. The (E)PDCCH for which the transmission is restricted may be a UE-specific search space (USS). The PDSCH corresponding to an SIB or paging may be excluded in this case. In another expression, an (E)PDCCH corresponding to a common search space (CSS) and a PDSCH corresponding thereto may be excluded from transmission restriction. The transmission restriction may be applied to a set of REs corresponding to a configuration set of a discovery signal as to a corresponding small cell, and may be applied in unit of a subframe/slot in which the discovery is transmitted or can be transmitted. Regarding the PRB set for the transmission restriction, transmission may be restricted on all regions according to a frequency region in which the discovery signal is transmitted, and may be restricted only on some RBs on which the discovery signal can be transmitted. In addition, regarding a region other than an RE corresponding to a discovery signal configuration for a cell, physical channels for which the transmission is restricted may be configured not to be transmitted in an RB for transmitting at least discovery signal transmission in a subframe or slot for the discovery signal transmission. In addition, simultaneous transmission of different channels may be avoided by limiting to OFDM symbols or a slot in which an RE for a discovery signal is included in the RB for the discovery signal transmission.

Since the discovery signal may be configured to be transmitted in the same subframe as that of a DMRS or the conventional CSI-RS, a method of handling this is required.

First, a specific method of handling a case where a discovery signal and a DMRS are configured in the same subframe is described as follows. In a method (A), an available or reserved RE set is configured not to overlap with the DMRS when setting a discovery signal configuration. In a method (B), in a case where a set of an RE corresponding to the discovery signal configuration is configured to overlap with an RE corresponding to the DMRS, the DMRS may be configured not to be transmitted as to an RE corresponding to a discovery signal configuration assigned to a corresponding cell in a subframe or slot for discovery signal transmission as to the corresponding cell. If a discovery signal is transmitted through some RBs, the DMRS may be transmitted in a region excluding an RB for the discovery signal. In a method (C), regarding a corresponding small cell, a DMRS may be configured not to be transmitted in an RB to which at least discovery signal transmission is assigned as to a subframe or slot for discovery signal transmission. In this case, it may be considered to restrict transmission of an EPDCCH/PDSCH operating based on the DMRS. In this case, a UE may skip a process of detecting the EPDCCH in a corresponding resource (a combination of a subframe and an RB).

Next, a specific method of handling a case where a discovery signal and a CSI-RS collide in the same subframe is described as follows. In a method (A), an RE for the conventional CSI-RS and an RE for the discovery signal may be configured not to overlap with each other through a higher layer. In a method (B), in a case where the CSI-RS and the discovery signal are transmitted in the same subframe or slot while allowing a configuration in which REs thereof can mutually overlap with each other, the CSI-RS is not allowed to be transmitted in all REs corresponding to a discovery signal configuration assigned to a corresponding cell. As such, an RE for restricting CSI-RS transmission may be limited to an RE belonging to an RB included in an RB region for discovery signal transmission. In a method (C), similarly to a case of the DMRS, as to a subframe or slot in which the discovery signal is to be transmitted, the CSI-RS may be configured not to be transmitted in an RB assigned to at least the discovery signal. In a method (D), in a case where the CSI-RS must be transmitted to protect an operation for the legacy UE's CSI-RS and CSI-interference measurement (IM), CSI-RS configuration information or CSI-IM configuration information for a neighbor small cell is additionally transmitted as to a UE which receives the discovery signal from a corresponding small cell. Thereafter, on the basis of acquired CSI-RS/IM configuration information, the UE may know that the discovery signal is not transmitted in all REs corresponding to a CSI-RS configuration. An RE in which the discovery signal transmission is restricted may be an RE belonging to an RB included in an RB region for CSI-RS/IM transmission/measurement. In a method (E), as to a subframe or slot for CSI-RS/IM transmission/measurement, the discovery signal may be configured not to be transmitted in an RB to which at least a CSI-RS/IM is assigned.

A problem in which an RE used to transmit the discovery signal and an RE used to transmit the CSI-RS/IM overlap with each other may be considered by being extended from a problem of a single cell to a problem of a plurality of cells. The plurality of cells may include a serving cell of a UE, a small cell for which the discovery signal is detected, and a neighbor cell to which a CSI-RS/IM configuration is given. When interference is measured through a CSI-IM resource in a neighbor cell, transmission of a discovery signal using the same RE (and the same configuration) may drop accuracy of interference measurement in a corresponding cell. In a case where the discovery signal overlaps with a resource of a CSI-IM or CSI-RS of neighbor cells, a UE according to the present specification may assume that the discovery signal is punctured and thus is not transmitted or assume that transmission power is decreased. For this, information of the CSI-RS or CSI-IM of the neighbor cells may be delivered to the UE according to the present specification, or a new field for reporting whether the discovery signal will be transmitted according to a specific periodicity or will be omitted may be delivered to the UE. If the field has a value of 0, the UE may assume that a next discovery signal will be omitted. The field is valid only for next one discovery signal, and cannot cover a case where the discovery signal is omitted two times consecutively. To overcome this, the field may be delivered to the UE irrespective of whether the discovery signal is transmitted or not. Alternatively, the discovery signals may be configured to be discovered by the UE through blind detection. For example, several positions at which the discovery signal can be located may be configured, and thereafter if the discovery signal is located at one of the positions, the discovery signal may be transmitted such that it does not overlap with a CSI-RS or CSI-IM of a neighbor cell, and the UE may detect the discovery signal through blind detection.

On the other hand, in order to improve detection performance of the UE as to the discovery signal, the small cell may map or reserve a resource of the discovery signal as to the entirety of a system bandwidth. Alternatively, in order to avoid performance deterioration due to dropping caused by a collision between different channels, a resource of the discovery signal may be reserved or mapped across some RBs. In a case where the discovery signal is configured to be transmitted in some RBs, if a system bandwidth is less than the number of RBs for transmission of the discovery signal, it may be transmitted across the entirety of the system bandwidth. However, if the number of RBs is less than or equal to the system bandwidth, the discovery signal may be transmitted using the determined number of RBs. The number of the some RBs may be 25 RBs or 6 RBs.

In the next-generation system, the discovery signal may be used to detect a cluster including a plurality of small cells or additionally to perform RLM/RRM for the cluster. In this case, the discovery signal may be configured to be transmitted also in a subframe in which a PBCH is transmitted. In addition, unlike the legacy CSI-RS, the discovery signal may be transmitted also in a special subframe in a TDD system, and in this case, a discovery signal configuration corresponding to a slot 0 may be used.

The aforementioned discovery signal has a purpose in which a UE effectively detects a cell (in addition, may have a purpose in which the cell detects another cell). In this case, there is no need to have correlation with a PDSCH when transmission power is set similarly to the conventional CSI-RS. Therefore, it may be interpreted that a freedom degree is higher than that of the conventional CSI-RS having a purpose of interference management when setting transmission power of the discovery signal. Therefore, the power setting for the discovery signal may be set through a higher layer signal. Alternatively, the power may be set by using a ratio with respect to cell-specific reference power. In this case, a ratio value may be set through a higher layer signal or may be pre-set. When the power is pre-set, it may be set to be equal to cell-specific reference power. In another method, it may be considered that an eNodeB corresponding to a cell autonomously sets a value.

The aforementioned embodiments of the present invention can be implemented through various means. For example, the embodiments of the present invention can be implemented in hardware, firmware, software, combination of them, etc. Details thereof will be described with reference to the drawing.

Figure 14:
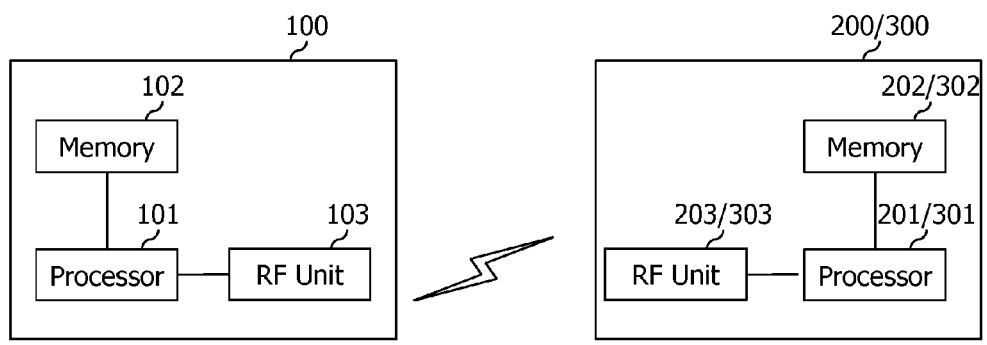
FIG. 14 is a block diagram illustrating a wireless communication system according to an embodiment of the present invention.

FIG. 14 is a block diagram illustrating a wireless communication system according to an embodiment of the present invention.

BSs 200 and 300 include processors 201 and 301, memories 202 and 302, and radio frequency (RF) units 203 and 303. The memories 202 and 302 coupled with the processors 201 and 301 store a variety of information for driving the processors 201 and 301. The RF units 203 and 303 coupled to the processors 201 and 301 transmit and/or receive radio signals. The processors 201 and 301 implement the proposed functions, procedures, and/or methods. In the aforementioned embodiment, an operation of the BS may be implemented by the processors 201 and 301.

A UE 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of a terminal receiving a discovery signal from a small cell, the method comprising:
   receiving, from a serving cell, information related to configuration sets of discovery signals with respect to a plurality of clusters, each of the plurality of clusters including neighbor small cells that transmit the discovery signals even in an off state;
   determining configuration information for the discovery signals of the neighbor small cells belonging to each of the plurality of clusters based on the corresponding received information; and
   detecting a discovery signal from a corresponding small cell based on the corresponding determined configuration information,
   wherein the information is received with respect to each of the plurality of clusters,
   wherein each of the plurality of clusters use different configuration sets,
   wherein neighbor cells belonging to a same one of the plurality of clusters use a same configuration set, and
   wherein the determined configuration information includes transmission timing of each of the corresponding discovery signals.

2. The method of claim 1, wherein each of the discovery signals is received on a resource element (RE) other than an RE configured for a channel state information-reference signal (CSI-RS) of the corresponding small cell.

3. The method of claim 1, wherein the determined configuration information further includes at least a physical resource block (PRB) mapping scheme or a sequence index of the corresponding discovery signal.

4. The method of claim 1, wherein a radio resource on which each discovery signal is transmitted from the corresponding small cell is configured not to overlap with a radio resource for a channel state information reference signal (CSI-RS) or a CSI-interference measurement (IM) from another neighbor small cell.

5. The method of claim 1, wherein each discovery signal is received on a first slot of a special subframe based on time division duplex (TDD).

6. The method of claim 1, wherein the received information is determined based on a physical cell identifier (ID) or an identity dedicated to the corresponding small cell.

7. The method of claim 1, wherein a resource element (RE) on which a discovery signal is detected from one small cell operates as a muting RE for another small cell.

8. A terminal for receiving a discovery signal from a small cell, the terminal comprising:
   a receiver for receiving information related to configuration sets of discovery signals from a serving cell with respect to a plurality of clusters, each of the plurality of clusters including neighbor small cells that transmit the discovery signals even in an off state,
   wherein the plurality of the clusters use different configuration sets from each other, and; and
   a controller for:
   determining configuration information for the discovery signals of the neighbor small cells belonging to each of the plurality of clusters based on the corresponding received information; and
   detecting a discovery signal from a corresponding small cell based on the corresponding determined configuration information,
   wherein the information is received with respect to each of the plurality of clusters,
   wherein each of the plurality of clusters use different configuration sets,
   wherein neighbor cells belonging to a same one of the plurality of clusters use a same configuration set, and
   wherein the configuration information includes transmission timing of each of the corresponding discovery signals.

9. The terminal of claim 8, wherein each of the discovery signals is received on a resource element (RE) other than an RE configured for a channel state information-reference signal (CSI-RS) of the corresponding small cell.

10. The terminal of claim 8, wherein the determined configuration information further includes at least a physical resource block (PRB) mapping scheme or a sequence index of the corresponding discovery signal.

11. The terminal of claim 8, wherein a radio resource on which each discovery signal is transmitted from the corresponding small cell is configured not to overlap with a radio resource for a channel state information reference signal (CSI-RS) or a CSI-interference measurement (IM) from another neighbor small cell.

12. The terminal of claim 8 wherein each discovery signal is received on a first slot of a special subframe based on time division duplex (TDD).

13. The terminal of claim 8, wherein the received information is determined based on a physical cell identifier (ID) or an identity dedicated to the corresponding small cell.

14. The terminal of claim 8, wherein a resource element (RE) on which a discovery signal is detected from one small cell operates as a muting RE for another small cell.

* * * * *